March 19, 1935.　　　　J. MIHALYI　　　　1,994,586
MAGAZINE TYPE OF MOTION PICTURE CAMERA
Filed Oct. 1, 1932
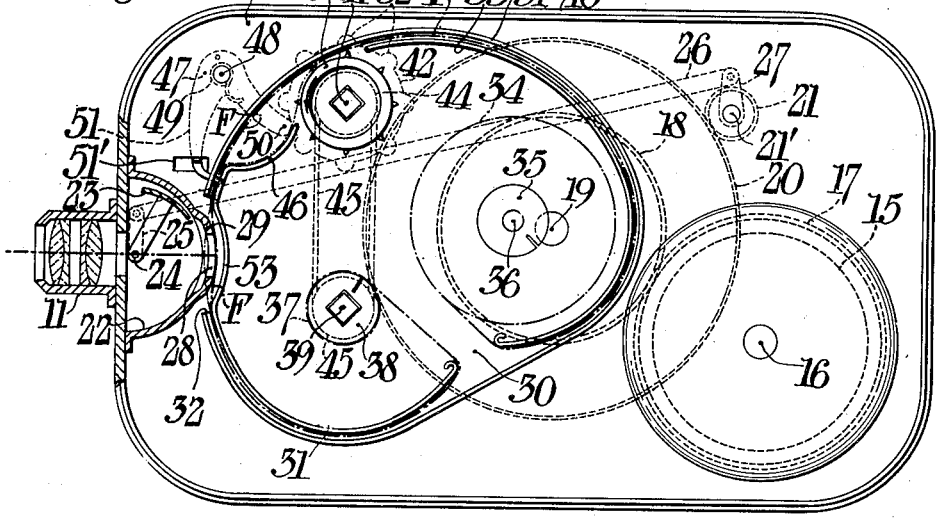
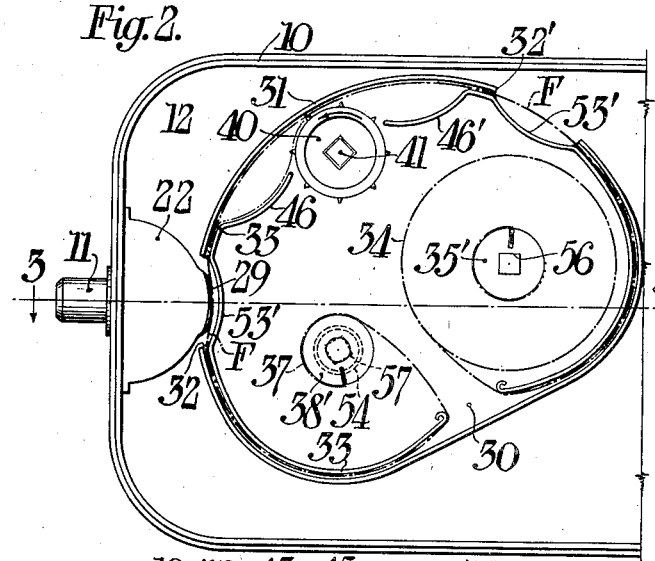
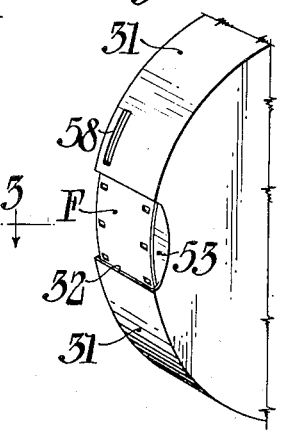
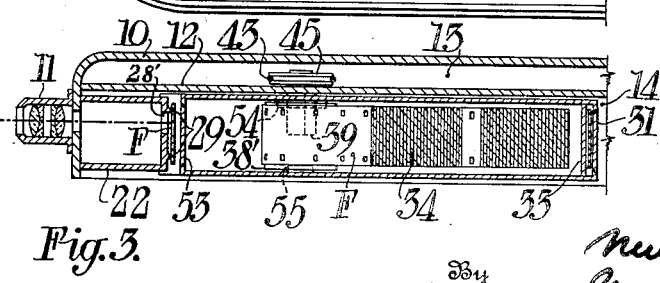
Inventor:
Joseph Mihalyi,
By Newton M. Perrins
George A. Gillette, Jr.
Attorneys.

Patented Mar. 19, 1935

1,994,586

UNITED STATES PATENT OFFICE 1,994,586

MAGAZINE TYPE OF MOTION PICTURE CAMERA

Joseph Mihalyi, Rochester, N. Y., assignor to Eastman Kodak Company, Rochester, N. Y., a corporation of New York Application October 1, 1933, Serial No. 685,731

14 Claims. (Cl. 88—17)

The present invention relates to a magazine type of motion picture camera and more particularly to a camera in which the film is accurately located by a gate member in the camera and in which longitudinal strips of the film may be individually exposed.

The prior art has already recognized that the film from a magazine within a camera may be accurately positioned with respect to the objective of the camera by the employment of additional means to maintain the film in contact with the surface of a gate member in the camera. The additional means previously employed for so maintaining the film from the magazine against the gate member of the camera have comprised either a resiliently urged presser member or a plurality of springs.

The primary object of the present invention is the provision of a film magazine within a camera so that the inherent or natural resiliency of the film maintains a portion of it in contact with the gate member of the camera.

Another object of the present invention is the provision of a film magazine in a motion picture camera which is adapted to expose individually longitudinal strips of the film, the magazine being adapted to be positioned in two relatively inverted positions within the camera, whereby a portion of the film is maintained against the gate member of the camera by the resiliency of the film in either position of the magazine.

A further object of the present invention is the provision of a magazine having a plurality of openings which cooperate with a camera gate member to form an exposure gate for the film, the film passing through each opening of the magazine and making frictional engagement with the gate member of the camera at only one portion of the film for each position of the magazine so that the frictional resistance to the passing of film through the magazine is not increased by the fact that the film may be exposed in more than one opening of the magazine.

Other and further objects of the invention will be suggested to those skilled in the art in the course of the following disclosure.

The above and other objects are attained by the combination with a motion picture camera having a gate member with a convex surface of a film magazine having a guide means to convexly bow a portion of film through an opening in the magazine, said magazine being adapted to be located in the camera so that the convex surface of the gate member will form a concave bow in the portion of the film extending across the opening in the magazine. It should be noted that no additional means are required to hold the film at the opening of the magazine in contact or frictional engagement with the convex surface of the camera gate member because the resiliency of the film is employed to maintain the portion of film being exposed in contact and conformation with the convex surface of the gate member in the camera. The type of gate composed of a fixed convex surface in the camera and a resiliently bowed portion in the film protruding from the magazine is especially adaptable to that type of camera in which longitudinal strips of the film are individually exposed. The provision of more than one opening in a film magazine for exposure of the film will obviously increase the frictional resistance to the movement of film through the magazine, because increased frictional resistance will be required at each opening in order to hold the film in a predetermined plane during exposure. However, according to the present invention the frictional engagement between the film and the gate member of the camera is created only during the exposure at any particular magazine opening, the frictional resistance at the other opening of the magazine being eliminated when the magazine opening is not in cooperation with the camera gate member to form an exposure gate for the film. The specific construction of the magazine according to the invention contributes to the success and practicability of the combination between the camera and film magazine.

Reference is hereby made to the accompanying drawing in the several figures of which similar reference numerals designate similar elements and in which:

Fig. 1 is a side elevation of a motion picture camera containing a film magazine according to the invention, a fragmentary section through the gate of the camera being illustrated. The covers for the camera and for the magazine have been removed for better illustration of the internal parts.

Fig. 2 is a fragmentary side elevation of a modified form of camera for individually exposing longitudinal strips of the film, the covers for the camera and magazine again are not shown for better illustration of the internal members.

Fig. 3 is a cross section of the modified form of camera and magazine taken on the line 3—3 of Fig. 2.

Fig. 4 is a fragmentary perspective view of the magazine according to the invention illustrating the manner in which a portion of the film is convexly curved across or through an opening of the magazine.

In the illustrated embodiments of the present invention the camera proper is composed of a camera casing 10 supporting an objective 11 and provided with a mechanism plate 12 extending longitudinally of the camera and dividing the casing 10 into a mechanism chamber 13 and a magazine chamber 14, see Fig. 3.

A spring motor 15, see Fig. 1, is mounted upon a stud 16 and rotates an annular gear 17 which meshes with a gear 18 mounted on a shaft 19 in the mechanism chamber 13. A large pinion gear 20 is also mounted upon shaft 19 and meshes with a small pinion gear 21 fixed to a shaft 21'.

A gate member 22 is located at the front of camera casing 10 and is hemispherical in shape to contain a shutter 23 attached to a pin 24. An arm 25 is also attached to pin 24 within mechanism chamber 13 and is pivotally connected to a link 26. The other end of link 26 is pivotally connected to an arm 27 attached to shaft 21'. Consequently upon rotation of spring motor 15 to deliver up its energy, gears 17, 18, 20 and 21 are rotated, arm 27 is also rotated to oscillate link 26 and arm 25 so that the shutter 23 is swung back and forth within the hemispherical gate member 22.

The gate member 22 has a convex surface preferably made up of a pair of rails 29 which extend along gate member 22 and which are laterally spaced so as to engage the perforated margins of the film, see Fig. 3. Gate member 22 is also provided with an exposure aperture 28 which is in alignment with objective 11.

The film magazine according to the invention is provided with an opening across which a portion of the film may be convexly curved, guide means being provided within the magazine to support the film so that a portion of it is bowed convexly across the opening in the magazine. The film magazine may be composed of a casing 30 having outer wall 31 which is provided with an opening 32. An inner wall 33 is located within the casing 30, is spaced from outer wall 31 so as to form a guiding channel for the film and is provided with a concave portion 53 which is opposite to and co-extensive with opening 32. The film guide channel, which is formed by walls 31 and 33, causes a portion of the film to assume a convex formation across opening 32, see Fig. 4, and when the magazine is located within the camera the convex surface of gate member 22 engages the portion of the film protruding from the magazine and curves the same into a concave formation extending into concave portion 53 of the magazine and into conformation with the curved surface of gate member 22.

According to Fig. 1, the film F extends through the film guide channel or between walls 31 and 33, is supplied from a supply roll 34 provided on a core 35 which rotates on a spindle 36 in the magazine, and is received by a take-up roll 37 on a core 38 rotated by a square spindle 39.

A toothed means is adapted to engage the film within the film guiding channel and is also adapted to advance the film through this channel. Such a toothed means may be composed of a sprocket wheel 40 rotatably mounted within casing 30 of the film magazine. Sprocket wheel 40 is driven by a square spindle 41 which also supports a gear 42 in mesh with large pinion gear 20. A spring belt 43 encircles a pulley 44 on spindle 41 and a pulley 45 on spindle 39. Pulley 45 has a smaller diameter than pulley 44 so that the takeup roll 37 will be driven at a peripheral speed greater than that necessary for winding up the film fed to it.

The film advancing arrangement which is employed optionally will now be described with respect to Fig. 1. A concave portion 46 is provided in inner wall 33 within the magazine. A trigger 47 is pivotally mounted on a stud 48 and is biased to the position shown in Fig. 1 by a coil spring 49 having one end engaging mechanism plate 12 and the other end engaging an arm 50 of trigger 47. A claw arm 51 is bent to pass through aperture 51' in mechanism plate 12 and enters a slot 58, see Fig. 4, in the film magazine to engage the marginal perforations of film F which is being guided between outer wall 31 and inner wall 33. A plurality of small cams 52 are mounted on gear 42. Said cams 52 are adapted to engage the end of arm 50 but cause no interference to the engagement between gear 42 and large pinion gear 20. As sprocket wheel 40 is rotated in the direction of the arrow, the film F is formed into a loop within concave portion 46, indicated by dot-dash lines in Fig. 1, because claw arm 51 is in engagement with a film perforation and prevents longitudinal movement of the film. At the proper time one of the cams 52 momentarily moves arm 50 of trigger 47 against the action of coil spring 49 so that claw arm 51 disengages the film perforation and the resiliency of the film in the loop within concave portion 46 causes the film to straighten out with longitudinal movement of the film through the film guiding channel. The claw arm 51 returns almost instantaneously to its film engaging position and slips into the next perforation of the film to hold it for formation of another loop within concave portion 46. The resilient take-up for the film also assists in moving the film across the opening 32 of the film magazine. Consequently the movement of the film through the exposure gate formed by the convex surface on gate member 22 and the opening 32 in the magazine is the result of a pushing action created by the formation of the loop in the film within concave portion 46 and a pulling action created within spring belt 43 of the take-up system.

The location of the film within a camera according to the invention is now accomplished in the following manner. The guiding means or the film guiding channel within the magazine supports the film F so that it bulges through opening 32 of the magazine. In other words, walls 31 and 33 of the magazine maintain a portion of the film in a convex bow across opening 32, as indicated by the dotted lines in Fig. 1 and as shown in perspective in Fig. 4. The magazine is now dropped into the camera with spindles 39 and 41 properly engaging the take-up core 38 and the sprocket wheel 40, respectively. The portion of the film which was previously convexly bowed in the opening of the magazine is now caused to assume a concave formation by engagement with the convex surface or rails 29 on gate member 22. It will be noted that a reverse curve is formed in the film and those skilled in the art will readily understand that the inherent resiliency of the film will maintain the portion across opening 32 in conformation with the convex surface of gate member 22.

The particular form of exposure gate just disclosed is quite advantageous when employed in a camera which is adapted individually to expose longitudinal strips of the film. Such modification of the camera according to the invention is illustrated in Figs. 2 and 3. The only changes in the camera proper are the location of exposure aperture 28', which must be off-set laterally with respect to the film F, and the proper alignment of objective 11 with respect to this off-set exposure aperture 28'. The film magazine is made fully symmetrical about an axis through sprocket wheel 40 by the provision of a second opening 32', another concave portion 53' and another concave portion 46'. The film may be advanced through the magazine and exposure gate in the manner previously described or by any other of the well known mechanisms for intermittently advancing motion picture film.

The film cores 35' and 38' are adapted to be driven alternatively by spindle 39 when the magazine is in either of two positions inverted with respect to each other within the camera. For this purpose, cores 35' and 38' are rotatably mounted on annular flanges 54 and 55 which are struck up from opposite sides of the magazine and are each provided with square axial holes 56 and 57, respectively, which are provided at opposite ends of the cores with respect to each other and which are available to spindle 39 through either of the opposite sides of the magazine.

This modification of the invention presents an additional advantage over the ordinary magazine camera for individual exposure of longitudinal strips on the same film. The magazine is adapted to assume two relatively inverted positions within the camera and according to the invention the film is exposed in each position at different openings in the magazine. Sufficient friction or tension must be provided at any exposure gate to maintain the film in a predetermined plane for proper exposure, such a plane being the focal plane of the objective. When two exposure gates are used, the frictional resistance to the movement of film through the magazine would be increased in this type of camera by an amount equal to the resistance at the additional exposure gate. By the use of the type of exposure gate according to the invention, however, this additional frictional resistance is eliminated because the frictional engagement necessary to hold the film flat is only present when required at the opening of the magazine at which the film is being exposed. Referring to Fig. 2 it will be noted that the film F is reversely curved only at the exposure position, whereas the film F moving across opening 32' of the magazine is in its normal convexly curved position. Hence the frictional engagement or tension necessary to hold the film flat during exposure is present at the reversely curved portion of the film and the film may move freely across the aperture 32'.

Since many modifications of the present invention are possible without departing from the spirit of the invention, the present disclosure is to be construed in an illustrative and not in a limiting sense. It is to be understood that any type of shutter mechanism or any type of film advancing mechanism may be employed on the camera. It should also be understood that the take-up system or prime mover for the camera may be replaced by any equivalent construction.

Having now particularly described my invention what I desire to secure by Letters Patent of the United States and what I claim is:

1. The combination with a film magazine provided with an opening and containing guide means having curved walls on each side of the opening forming arcs of the same convex curve to conduct a motion picture film in a convex arc across said opening, of a motion picture camera having a gate member with a convex surface which is adapted to curve the film at said opening into a concave arc, the inherent resiliency of the film maintaining the film at said opening in conformation with the convex surface of said gate member.

2. The combination with a film magazine provided with an opening and having guide channels having curved walls on each side of the opening forming arcs of the same convex curve convexly to bow an unsupported portion of film across said opening, of a motion picture apparatus having a gate member with a convex surface which is adapted to engage and form a concave curve in said unsupported portion of the film, the natural resiliency of which maintains it in contact and in conformity with the convex surface of said gate member.

3. In a motion picture camera, the combination with a gate member having a convex surface, of a film magazine adapted to assume either of two relatively inverted positions within the camera and provided with two recesses which are symmetrically located with respect to the axis of magazine inversion and across which portions of the film are convexly bowed, the convexly bowed portions of the film being adapted alternatively to be curved concavely and conform to the convex surface of the gate member in respective positions of said magazine.

4. In a motion picture camera adapted individually to expose longitudinal strips of a motion picture film, the combination with a film magazine adapted to be located in either of two relatively inverted positions within said camera and provided with two recesses which are symmetrically located with respect to the axis of magazine inversion and across which portions of the film are convexly bowed, of a gate member having a convex surface which is adapted alternatively to form a concave curve in said portions of the film and which is provided with an aperture laterally offset with respect to the film to expose said longitudinal strips thereof.

5. In a motion picture camera adapted individually to expose longitudinal strips of a motion picture film, the combination with a film magazine adapted to be located in either of two relatively inverted positions within said camera, provided with two recesses which are symmetrically located with respect to the axis of magazine inversion and having guide channels adapted convexly to bow portions of film across each recess, of a gate member having a convex surface which is adapted alternatively to form a concave curve in said portions of said film.

6. In a motion picture camera, the combination with a film magazine adapted to be located in either of two relatively inverted positions within said camera and provided with two openings which are symmetrically located with respect to the axis of magazine inversion and across which portions of the film extend, of a gate member adapted to cooperate with either of said openings in each position of the magazine to form an exposure gate for the film.

7. In a motion picture camera, the combination with a film magazine adapted to be located in either of two relatively inverted positions within said camera and provided with two openings which are symmetrically located with respect to the axis of magazine inversion and across which portions of the film extend, of a gate member adapted frictionally to engage either portion of the film extending across one of said openings in each position of the magazine and to maintain the film in a predetermined plane for exposure.

8. In a motion picture camera, the combination with a film magazine adapted to be located in either of two relatively inverted positions within said camera and provided with two openings which are symmetrically located with respect to the axis of magazine inversion and across which portions of the film extend, of a gate member adapted to cooperate with either of said openings and frictionally to engage either portion of the film in each position of said magazine to form an exposure gate for the film.

9. In a motion picture camera adapted individually to expose longitudinal strips of a motion picture film, the combination with a film magazine adapted to be located in either of two relatively inverted positions within said camera and provided with two exposure openings which are symmetrically located with respect to the axis of magazine inversion and across which portions of the film are convexly bowed, of a gate member having a convex surface which is adapted frictionally to engage said portions of the film and which frictionally engages only one of said portions in each position of the magazine.

10. In a film magazine, the combination with a casing having an outer wall which is convexly curved and provided with an opening, the outer wall portions on each side of the opening forming arcs of the same convex curve, of a second wall within said casing and which is curved similarly to but spaced from said outer wall to form a film guiding channel and which together with said outer wall forms a convex curve in the film extending across said opening.

11. In a film magazine, the combination with a casing having an outer wall which is convexly curved and provided with an opening, the outer wall portions on each side of the opening forming arcs of the same convex curve, of a second wall within said magazine, which is curved similarly to but spaced from said outer wall to form a film guiding channel, which together with said outer wall forms a convex curve in the unsupported film extending across said opening and which has a concave portion opposite the opening in said outer wall.

12. In a film magazine, the combination with a casing having an outer wall which is convexly curved and provided with an opening, of a second wall within said casing and which is spaced from said outer wall to form a film guiding channel and adapted to form a convex curve in the film extending across said opening, a toothed means adapted to engage and move a film through said film guiding channel, and a concave portion in said second wall adjacent said toothed means and adapted to receive a film loop.

13. In a film magazine adapted to assume two operative positions which are inverted with respect to each other, the combination with a casing having an outer wall which is convexly curved and which is provided with two openings symmetrically located with respect to the axis of magazine inversion, of a second wall within said casing, which is spaced from said outer wall to form a film guiding channel and adapted to form convex curves in the film extending across said opening, and which has concave portions opposite the opening in said outer wall, a toothed means adapted to engage and move a film through said film guiding channel, and concave portions in said second wall on each side of said toothed means and adapted to receive a film loop.

14. In a film magazine adapted to assume two operative positions which are inverted with respect to each other for alternate exposure of laterally adjacent longitudinal strips of film, the combination with a casing having an outer wall which is provided with two openings which are symmetrically located with respect to the axis of magazine inversion, of a second wall within said casing, spaced from said outer wall and adapted to form a convex bow in the portions of film extending across said openings.

JOSEPH MIHALYI.